United States Patent
Klingler et al.

(10) Patent No.: US 9,722,471 B2
(45) Date of Patent: Aug. 1, 2017

(54) ELECTRIC DRIVE MOUNTED ON A RADIALLY OFFSET BEARING

(71) Applicant: BROSE FAHRZEUTEILE GMBH & CO. KOMMANDITGESELLSCHAFT, WUERZBURG, Wuerzburg (DE)

(72) Inventors: Peter Klingler, Neubrunn (DE); Maik Brumme, Wuerzburg (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 215 days.

(21) Appl. No.: 14/490,729

(22) Filed: Sep. 19, 2014

(65) Prior Publication Data
US 2015/0076937 A1    Mar. 19, 2015

(30) Foreign Application Priority Data
Sep. 19, 2013    (DE) .................. 10 2013 015 613

(51) Int. Cl.
*H02K 5/24*    (2006.01)
*H02K 5/16*    (2006.01)
*H02K 7/08*    (2006.01)

(52) U.S. Cl.
CPC .............. *H02K 5/24* (2013.01); *H02K 5/161* (2013.01); *H02K 7/081* (2013.01)

(58) Field of Classification Search
CPC   H02K 5/24; H02K 5/161; H02K 5/16; H02K 5/1732; H02K 7/081; H02K 7/08
USPC .............................................. 310/51, 83, 99
See application file for complete search history.

(56) References Cited

U.S. PATENT DOCUMENTS 6,710,484 B2      3/2004   Kitoh et al.
2004/0012283 A1 *  1/2004   Kitoh .................. H02K 7/1166
                                                      310/77

FOREIGN PATENT DOCUMENTS

| DE | 851379 C | 10/1952 | |
| DE | 2025621 A1 * | 12/1971 | ............. H02K 7/083 |
| DE | 4105982 C1 | 8/1992 | |
| DE | 19944133 A1 | 10/2000 | |
| DE | 10223529 A1 | 1/2003 | |
| DE | 102007057706 A1 | 6/2009 | |
| DE | WO 2009068348 A1 * | 6/2009 | ............. F16C 23/04 |
| DE | 102010003727 A1 | 10/2011 | |

(Continued)

OTHER PUBLICATIONS

Machine translation of WO 2009068348 A1 (Jun. 2009).*
Machine translation of DE 2025621 A1 (Dec. 1971).*

*Primary Examiner* — Michael Andrews
(74) *Attorney, Agent, or Firm* — Laurence A. Greenberg; Werner H. Stemer; Ralph E. Locher

(57) ABSTRACT

An electric drive contains an electric motor for generating a driving force and a transmission for transmitting the driving force. The electric motor has a motor housing, a rotor arranged in the motor housing, and a motor shaft which bears the rotor. The transmission has at least two transmission elements which are coupled in terms of the transmission of force. The electric drive furthermore contains a drive housing for accommodating the electric motor and the transmission. Moreover, the motor shaft is mounted by at least a first radial bearing and a second radial bearing and braced transverse to its axis of rotation. The second radial bearing being arranged radially offset to the axis of rotation.

8 Claims, 3 Drawing Sheets

(56) References Cited

FOREIGN PATENT DOCUMENTS

DE     202012001206 U1    3/2012
WO      2009068348 A1    6/2009

\* cited by examiner

ELECTRIC DRIVE MOUNTED ON A RADIALLY OFFSET BEARING

CROSS-REFERENCE TO RELATED APPLICATION

This application claims the priority, under 35 U.S.C. §119, of German patent application DE 10 2013 015 613.0, filed Sep. 19, 2013; the prior application is herewith incorporated by reference in its entirety.

BACKGROUND OF THE INVENTION

Field of the Invention

The invention relates to an electric drive which has in particular an electric motor and a transmission coupled to it.

Conventional electric motors have a motor shaft which bears the rotor and rotates about its longitudinal axis during operation. In the case of an electric drive, the motor shaft is conventionally coupled to a component to be driven for transmission of its movement and coupled on the output side to a transmission for transmission of the driving force of the electric motor. In order to enable as smooth as possible rotation of the motor shaft, the motor shaft is generally mounted along its longitudinal axis by at least two radial bearings.

Such radial bearings involve, for example, roller bearings. Particularly in the case of electric motors and drives with particularly small dimensions, plain bearings are also used as radial bearings. These are generally lower cost and lighter than roller bearings. A plain bearing is conventionally embodied as a sleeve which is formed from a material with a coefficient of friction which is particularly low in comparison to the motor shaft. In order to simplify, for example, mounting of the plain bearing on the motor shaft, prevent a tilting in the case of several plain bearings distributed across the longitudinal axis and equalize different thermal expansions of the plain bearing and the motor shaft, the plain bearings are usually embodied with a small degree of bearing play with respect to the motor shaft (i.e. with a slightly larger inner diameter than the outer diameter of the motor shaft). As a result of this bearing play, noise (e.g. "rattling") can occur particularly in the case of oscillations of the rotor which are caused, for example, by imbalances or a change in the rotational speed.

SUMMARY OF THE INVENTION

The object on which the invention is based is to develop an electric drive with particularly low development of noise.

The electric drive according to the invention contains an electric motor which is preferably set up and provided to generate a driving force and which has a motor housing, a rotor arranged in the motor housing and a motor shaft which bears the rotor. The electric drive furthermore contains a transmission which is preferably set up to transmit the driving force and which has at least two transmission elements which are coupled to one another in terms of the transmission of force. The electric drive furthermore includes a drive housing for accommodating the electric motor and the transmission. According to the invention, the motor shaft is mounted at least by a first radial bearing and a second radial bearing (rotatably about its axis of rotation) and braced transverse to its axis of rotation.

Here, the motor shaft is braced by an arrangement of the second radial bearing offset radially with respect to the axis of rotation. This means that the second radial bearing with its bearing axis is offset by a predefined distance parallel to the axis of rotation of the motor shaft, in particular to the bearing axes of one or the other radial bearing. It is achieved as a result that the motor shaft has across almost its entire length a bending with an approximately homogeneous profile and in particular at both ends is pressed in each case in the same direction onto the respective inner wall of the first or second radial bearing. The parallel-offset arrangement is also referred to as "coaxial".

"Braced" is understood here and below such that the motor shaft is deformed at least slightly elastically. It is achieved as a result that the motor shaft is pressed against the inner wall under the action of the restoring force (which counteracts this deformation) despite bearing play which may be present at all times in a contact region of the inner wall of the respective radial bearing, i.e. bears against the inner wall. The motor shaft is therefore mounted in the radial bearings with pretensioning. As a result of this, it is effectively prevented that the motor shaft can change, i.e. "thrash" to and fro, in the case of existing bearing play during operation (i.e. in the case of a rotating motor shaft) unhindered transverse to the axis of rotation between various points of contact distributed across the inner circumference of the respective radial bearing. Noises resulting from such a movement of the motor shaft are effectively prevented or at least reduced by the bracing of the motor shaft. In order to introduce the elastic deformation onto the motor shaft, for example, at least one of the radial bearings with its bearing axis is arranged transversely or obliquely offset with respect to the bearing axis of the other radial bearing and/or with respect to the axis of rotation of the motor shaft.

As a result of the bracing of the motor shaft, it is furthermore achieved that the motor shaft can be bent to a less pronounced extent as a result of a transverse movement (in particular an oscillation) of the rotor (e.g. as a result of an imbalance) in comparison to a non-braced motor shaft. The oscillation amplitude of the rotor can thus also be reduced by the bracing. Moreover, the oscillations of the rotor can be additionally damped by a bearing friction of the motor shaft in the radial bearings which is increased as a result of the bracing.

This bracing of the motor shaft is particularly advantageous in the event that the radial bearings involve in each case a plain bearing. These plain bearings are known to generally have an at least small degree of radial bearing play. The bracing of the motor shaft also, however, leads to a reduction in the development of noise in the case of roller bearings used as radial bearings (e.g. ball bearings), particularly in the case of roller bearings, the bearing play of which cannot be adjusted.

The electric drive preferably involves a drive for a vehicle part, for example, for an electric window regulator, for an automatic sliding roof, or the like. In the case of such a drive, plain bearings are often used to mount the motor shaft.

The drive housing involves, for example, the transmission housing which holds the transmission, on which transmission housing the electric motor with its motor housing is fixed (flanged on). In the context of the invention, the motor housing can, however, also be formed as an integral component of the drive housing.

The transmission elements of the transmission can in the context of the invention involve, for example, two friction wheels. This preferably involves, however, two gear wheels, with in the context of the present invention the term gear wheel referring generally to a component which bears teeth (for at least partially positive transmission of force), such as e.g. a spur gear, a worm gear or a helical gear of a screw rolling transmission.

In a preferred embodiment, the motor shaft is mounted by a third radial bearing in addition to the first and the second radial bearings. In the context of the invention, it is conceivable that all three radial bearings are arranged coaxially to one another, i.e. that the bearing axis of the second radial bearing and the bearing axis of the third radial bearing are arranged by in each case at a different distance to the bearing axis of the first radial bearing. In a particularly preferred embodiment, however, the bearing axes of two of the three radial bearings are arranged flush with one another (i.e. on the same axis) and only the second radial bearing is arranged coaxially to the two other radial bearings. As a result of the mounting of the motor shaft by the three radial bearings, a particularly stable bracing is achieved, the bending of the motor shaft during operation of the electric motor preferably at all times lying in the same plane (and not moving about the axis of rotation in a similar manner to a skipping rope). In other words, the motor shaft is at all times bent in the same direction in relation to the electric drive.

It is in principle possible in the context of the invention that each of the radial bearings (i.e. the first and the second and where applicable the third radial bearing) is arranged on the motor housing and/or on a component assigned to the electric motor. In a preferred embodiment, however, the first radial bearing is arranged on the motor housing for end-side mounting of the motor shaft and the third radial bearing is arranged in particular on the drive housing for transmission-side mounting of the motor shaft. The third radial bearing mounts the motor shaft preferably at its transmission-side end. The second radial bearing is arranged here between the first radial bearing and the third radial bearing.

In one expedient embodiment, the second radial bearing is secured axially on its bearing seat in order to prevent an axial movement in particular of the second radial bearing. The bending of the motor shaft namely generally leads to a force component directed in the axial direction acting on each of the radial bearings, which force component can in turn lead to an axial displacement in particular of the second radial bearing. The first and the third radial bearing are also expediently secured axially.

In an expedient embodiment, the second radial bearing is arranged on a front plate which shuts off the motor housing with respect to the transmission. The front plate is set up and provided to bear (carbon) brushes, which during operation of the electric motor transmit the motor current to the sections of a commutator coupled to the motor shaft, in particular in the case where the electric motor is a DC motor. In this case, the front plate is also referred to as a "brush carrier". Due to the fact that in particular the first and the second radial bearings are arranged on the electric motor, the electric motor forms a subassembly unit with an already comparatively stably mounted motor shaft. This is particularly advantageous for mounting of the electric motor on the drive housing.

It is in principle possible in the context of the invention that the second radial bearing is embedded flush into the front plate. In an advantageous embodiment, the front plate has, however, an approximately tube-shaped extension which protrudes in the direction of the transmission from the front plate, which extension surrounds the motor shaft and on the free end side the bearing seat for the second radial bearing is formed. The bearing distance between the first and the second radial bearing can thus be defined across the length of this extension. Moreover, the second radial bearing can be arranged with as small as possible a distance to the transmission element (gear wheel) arranged on the motor shaft. A particularly rigid transmission arrangement is enabled by such a small distance between the transmission element and the second radial bearing, with the result that an oscillation of the transmission which occurs during operation can deflect the motor shaft only slightly transverse to the axis of rotation, as a result of which in turn noise is reduced.

In an expedient embodiment, the bearing seat for the second radial bearing is formed at least partially by two clamping tabs which protrude in the axial direction from the extension and are opposite one another in particular across the axis of rotation. These clamping tabs are preferably provided for axial fixing of the second radial bearing (in particular in the direction of the transmission). For example, for this purpose, the clamping tabs grip the second radial bearing at least partially from two radially opposite sides. The term "at least partially" is understood such that the clamping tabs are not formed across the entire length of the bearing seat and that they thus do not grip the second radial bearing across its entire bearing length. In the context of the invention, it is conceivable that the clamping tabs are formed to be particularly elastic in the manner of snap hooks, the second radial bearing during mounting being "clipped in" between the clamping tabs and thereby being clamped and/or positively retained under the action of a restoring force of the clamping tabs. The extension preferably has additionally on the inside a stop for the second radial bearing which prevents a movement of the second radial bearing in the direction of the electric motor.

In one optional or alternative embodiment, the extension of the front plate is inserted at the free end side with a press fit into the drive housing in such a manner that the inner diameter of the bearing seat is at least partially tapered. The second radial bearing is advantageously axially fixed by this tapering. It is conceivable in the context of the invention that the bearing seat fixes the second radial bearing by a clamping acting radially on the lateral surface of the second radial bearing. The embodiment of the bearing seat with the opposing clamping tabs is particularly advantageous in particular for the tapering of the inner diameter brought about by the press fit. These are namely known to be more flexible in comparison to an annularly closed profile of the extension so that mounting is simplified.

In a preferred embodiment, the bearing seat is configured to be longer in the axial direction than the second radial bearing in order as far as possible to avoid a clamping force acting radially on the second radial bearing. In other words, that region of the extension which forms the bearing seat, in particular both clamping tabs, protrudes axially beyond the second radial bearing. In particular, the drive housing is configured such that the press fit between the drive housing and the extension is only formed in a region of the bearing seat upstream of the second radial bearing. The inner dimensions of the drive housing are preferably only reduced in a portion corresponding to the upstream region of the bearing seat. It is achieved as a result that the inner diameter of the bearing seat is tapered almost only in this region upstream of the second radial bearing. No or only a small radial clamping force is thus exerted on the second radial bearing. Rather, the second radial bearing is stopped in the axial direction against the region with the tapered inner diameter and thus axially fixed by positive locking.

Other features which are considered as characteristic for the invention are set forth in the appended claims.

Although the invention is illustrated and described herein as embodied in an electric drive, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Corresponding parts are provided with the same reference numbers at all times in all the figures.

Figure 1:
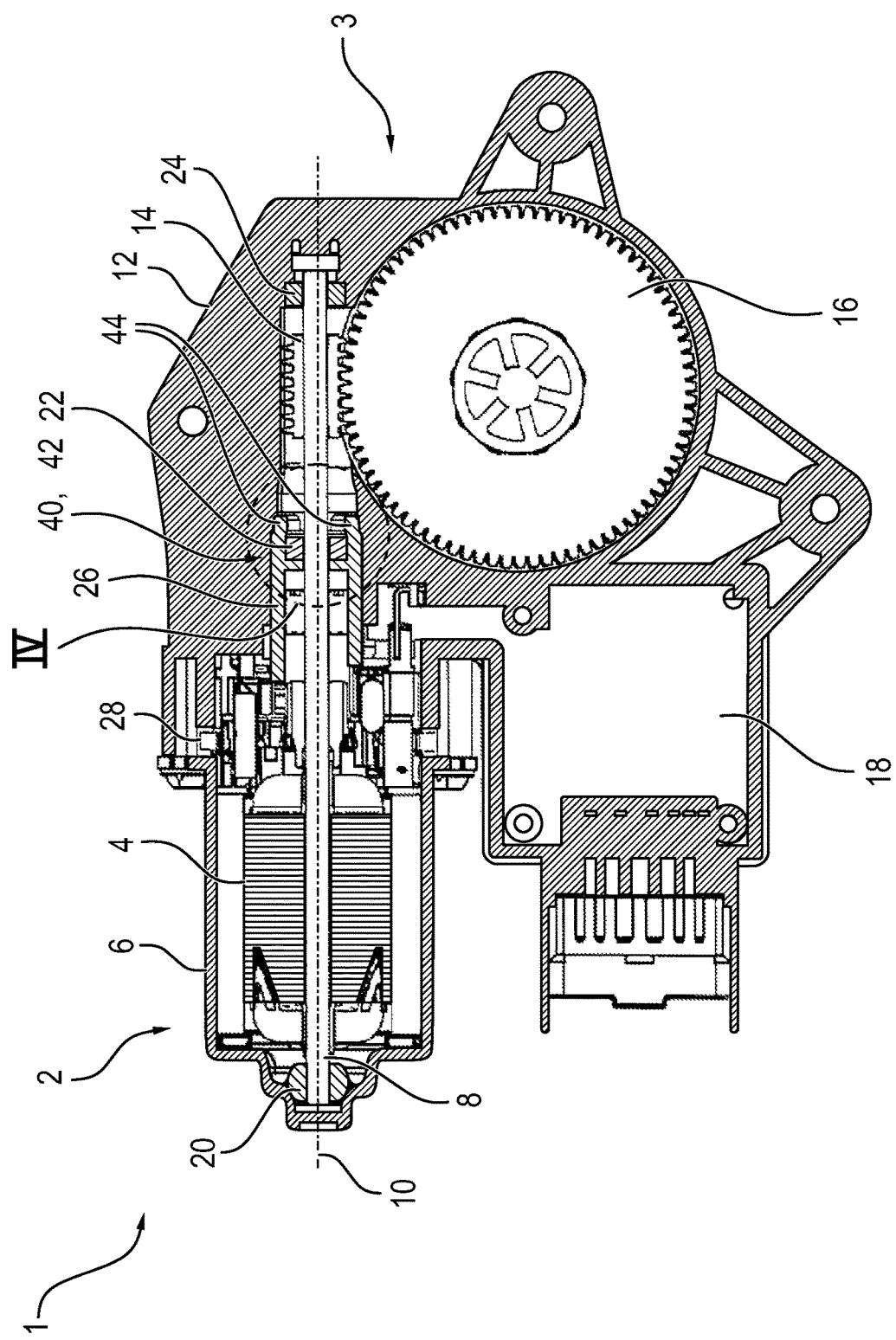
FIG. 1 is a diagrammatic, sectional view of an electric drive with an electric motor and with a transmission, the electric motor and the transmission being coupled to one another via a motor shaft according to the invention.

Referring now to the figures of the drawings in detail and first, particularly to FIG. 1 thereof, there is shown an electric drive 1 in a sectional representation. The electric drive 1 contains an electric motor 2 and a transmission 3. The electric motor 2 has a rotor 4 which is mounted rotatably within a motor housing 6. The electric motor 2 furthermore has a motor shaft 8 which bears the rotor 4 and rotates about an axis of rotation 10 during operation of the electric motor 2.

The electric drive 1 furthermore has a drive housing 12. The transmission 3 is arranged in the drive housing 12, which transmission 3 is formed by two gear wheels, to be precise a worm 14 arranged on motor shaft 8 and a worm gear 16 which cogs with it. The electric motor 2 is flanged with its motor housing 6 onto the drive housing 12. The drive housing 12 furthermore has an electronic controller 18 in which an electronic control unit, not represented in greater detail, for electric motor 2 is arranged.

The motor shaft 8 is mounted along its axis of rotation 10 by a first radial bearing 20, a second radial bearing 22 and by a third radial bearing 24. The first radial bearing 20 is arranged on the motor housing 6, while the third radial bearing 24 is arranged on the drive housing 12. The first and third radial bearings 20 and 24 form in each case a terminal bearing for the motor shaft 8. In other words, both the radial bearings 20 and 24 are arranged in each case at one end of motor shaft 8. The second radial bearing 22 is thus arranged between the radial bearings 20 and 24. The second radial bearing 22 is retained on a tube-shaped extension 26 which is in turn formed on a front plate 28 which shuts off motor housing 6 on the transmission side (see FIG. 3).

The radial bearings 20, 22 and 24 involve in each case a plain bearing. The first radial bearing 20 is embodied here as what is referred to as a cup and ball bearing. This means that the lateral surface of the first radial bearing 20 is cambered convexly (or "spherically") towards the outside. If such a cup and ball bearing is inserted into a correspondingly formed bearing seat, the cup and ball bearing can be pivoted as a result of its spherical outer contour in a comparable manner to a ball joint. An angle offset of the axis of rotation 10 can be balanced out as a result.

Figure 2:
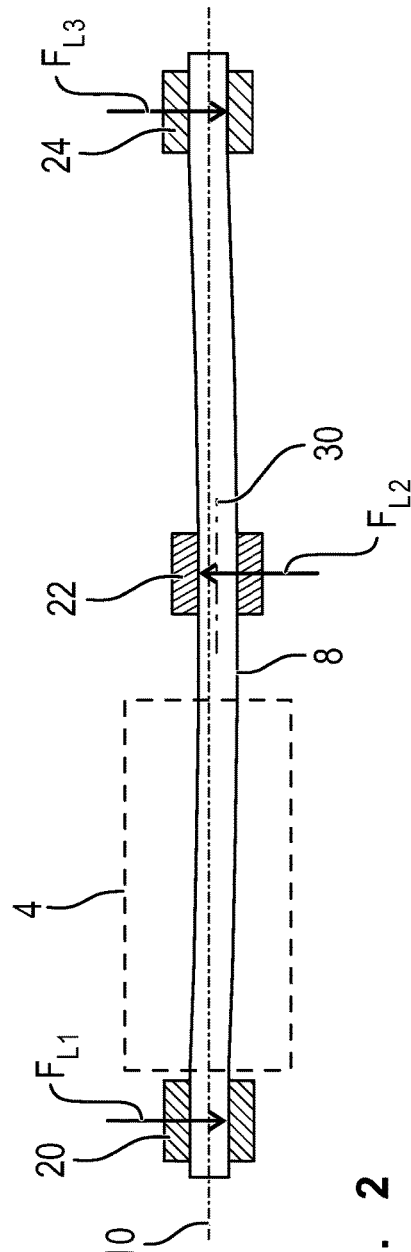
FIG. 2 is a schematic representation of the mounting of the motor shaft by use of three radial bearings.

The plain bearings are generally embodied and mounted with bearing play, i.e. with a slightly larger inner diameter than the outer diameter of the associated shaft. As a result, noise can arise during operation, i.e. in the case of a rotating shaft since the shaft is slightly movable transverse to its longitudinal axis as a result of the bearing play. In order to avoid such development of noise, the motor shaft 8, as represented schematically in FIG. 2, is braced transverse to its axis of rotation 10. To this end, the second radial bearing 22 with its bearing axis 30 is arranged offset radially to the axis of rotation 10. The axis of rotation 10 runs convergently with the respective bearing axes of first and third radial bearing 20 or 24. As a result, the motor shaft 8—as represented in an exaggerated manner by way of example in FIG. 2—is elastically bent. As a result of this bending of the motor shaft 8, it is achieved that motor shaft 8 is pressed onto the inner wall of respective radial bearing 20, 22 and 24 with in each case a bearing force $F_{L1}$, $F_{L3}$, or $F_{L3}$ resulting from the bending in a direction transverse to axis of rotation 10. It is furthermore achieved as a result that the motor shaft 8 is present in respective radial bearing 20, 22 or 24 without play in the direction of respective bearing force $F_{L1}$, $F_{L3}$, or $F_{L3}$, so that a thrashing (i.e. a transverse movement) of the motor shaft 8 within the respective radial bearing 20, 22 or 24 is effectively prevented.

Figure 3:
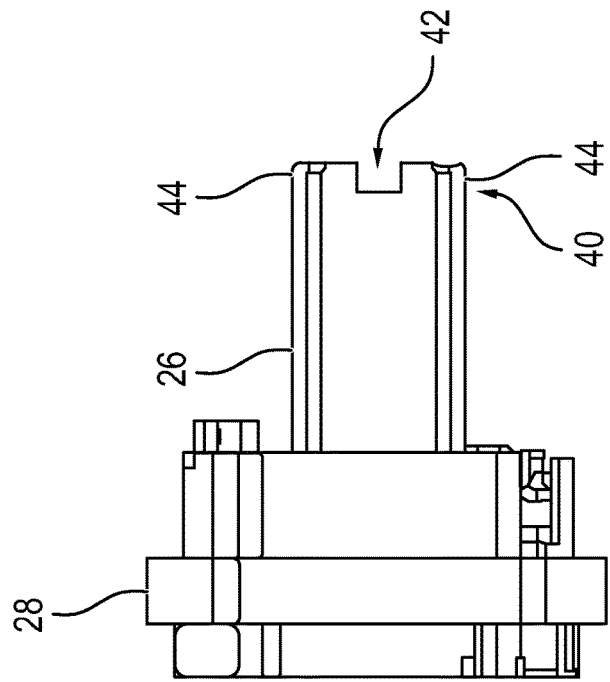
FIG. 3 is a schematic representation of a front plate of the electric motor with a bearing seat for the middle of the three radial bearings.
Figure 4:
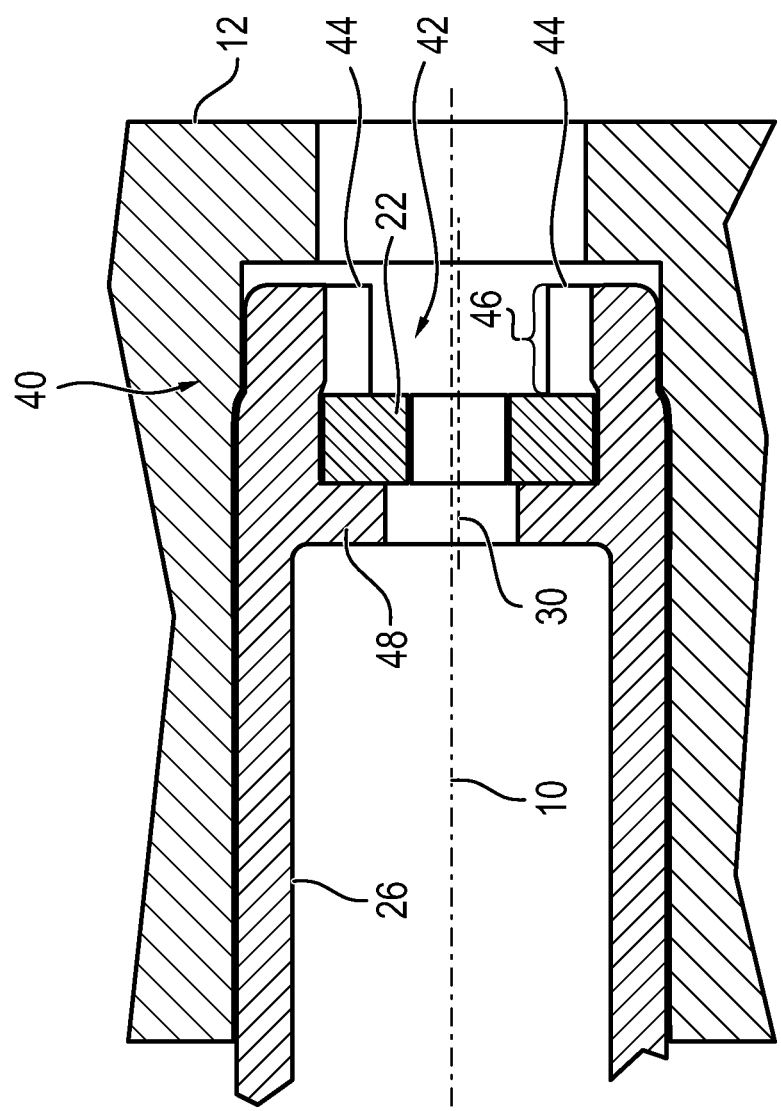
FIG. 4 is an enlarged section view of the representation IV according to FIG. 1 of the bearing seat of the middle radial bearing.

FIG. 3 shows the front plate 28 in greater detail. A bearing seat 42 for accommodating the second radial bearing 22 is arranged at a free end 40, which faces away from the motor housing 6, of the extension 26. As is apparent from FIG. 1 and FIG. 4, the extension 26 is inserted into a corresponding bore in the drive housing 12 in such a manner that the extension 26 lies at its free end 40 in the drive housing 12 with a press fit. In other words, the inner diameter of the bore in the drive housing 12 is smaller than the outer diameter of extension 26. The inner diameter of the extension 26 is reduced here. As a result, the second radial bearing 22 is secured against an axial displacement.

In order to simplify the reduction of the inner diameter by press fit, the extension 26 has in the region of the bearing seat 42 two projections referred to as clamping tabs 44. The projections 44 lie diametrically opposite across the axis of rotation 10. Moreover, as can be inferred from FIG. 4, the clamping tabs 44 protrude in the axial direction beyond the second radial bearing 22. As a result of the press fit between the drive housing 12 and the extension 26 or the clamping tabs 44, the bearing seat 42 is only tapered in a region 46 upstream of the second radial bearing 22 in its inner diameter. Almost no radially directed clamping force thus acts on the second radial bearing 22. An upstream region 46 therefore forms in the pressed-in state on the inside an axial, transmission-side stop for second radial bearing 22. In the direction of the rotor 4, the extension 26 has on the inside a heel 48 which is provided as a motor-side stop for the second radial bearing 22. In the pressed-in state into the drive housing 12, the second radial bearing 22 is therefore fixed positively on one hand against heel 48 and on the other hand against tapered region 46 of clamping tabs 44.

The following is a summary list of reference numerals and the corresponding structure used in the above description of the invention:

1 Electric drive
2 Electric motor

3 Transmission
4 Rotor
6 Motor housing
8 Motor shaft
10 Axis of rotation
12 Drive housing
14 Worm
16 Worm gear
18 Electronic shaft
20 Radial bearing
22 Radial bearing
24 Radial bearing
26 Extension
28 Front plate
30 Bearing axis
40 Free end
42 Bearing seat
44 Clamping tab
46 Region
48 Stop
$F_{L1}$ Bearing force
$F_{L2}$ Bearing force
$F_{L3}$ Bearing force

The invention claimed is:

1. An electric drive, comprising:
   an electric motor for generating a driving force, said electric motor having a motor housing, a rotor disposed in said motor housing, and a motor shaft bearing said rotor;
   a transmission for transmitting the driving force, said transmission having at least two transmission elements coupled in terms of a transmission of force;
   a drive housing accommodating said electric motor and said transmission; and
   radial bearings including at least a first radial bearing and a second radial bearing, said motor shaft being mounted by means of said first radial bearing and said second radial bearing and braced transverse to an axis of rotation of said motor shaft, and said second radial bearing disposed radially offset to the axis of rotation.

2. The electric drive according to claim 1, wherein:
   said radial bearings include a third radial bearing, said motor shaft being additionally mounted by means of said third radial bearing;
   said first radial bearing disposed on said motor housing for end-side mounting of said motor shaft, said third radial bearing being disposed for transmission-side mounting of said motor shaft on said drive housing; and
   said second radial bearing disposed between said first radial bearing and said third radial bearing.

3. The electric drive according to claim 1, further comprising a bearing seat, said second radial bearing being secured on said bearing seat against an axial movement.

4. The electric drive according to claim 3, further comprising a front plate for shutting off said motor housing with respect to said transmission, said second radial bearing disposed on said front plate.

5. The electric drive according to claim 4, wherein said front plate has a tube-shaped extension protruding in a direction of said transmission, said tube-shaped extension surrounding said motor shaft and on a free end side, said bearing seat for said second radial bearing is formed.

6. The electric drive according to claim 5, wherein said tube-shaped extension has two clamping tabs, said bearing seat for said second radial bearing being formed at least partially by said two clamping tabs which protrude from said tube-shaped extension in an axial direction and which are opposite one another across the axis of rotation.

7. The electric drive according to claim 5, wherein said tube-shaped extension is inserted into said drive housing at said free end side with press fit in such a manner that an inner diameter of said bearing seat is at least partially tapered.

8. The electric drive according to claim 7, wherein said bearing seat is configured to be axially longer than said second radial bearing, and said inner diameter of said bearing seat being tapered in a region void of said second radial bearing.

* * * * *